(12) United States Patent
Strahm et al.

(10) Patent No.: US 9,282,011 B2
(45) Date of Patent: Mar. 8, 2016

(54) NETWORK COMMUNICATION

(75) Inventors: Frederick William Strahm, Hillsboro, OR (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 12/981,644

(22) Filed: Dec. 30, 2010

(65) Prior Publication Data

US 2011/0096741 A1    Apr. 28, 2011

Related U.S. Application Data

(63) Continuation of application No. 09/811,161, filed on Mar. 16, 2001, now abandoned.

(51) Int. Cl.
*H04L 12/26* (2006.01)
*H04L 29/06* (2006.01)
*H04L 29/08* (2006.01)

(52) U.S. Cl.
CPC ............ *H04L 43/00* (2013.01); *H04L 12/2602* (2013.01); *H04L 29/06* (2013.01); *H04L 67/04* (2013.01); *H04L 67/14* (2013.01); *H04L 67/325* (2013.01); *H04L 43/0811* (2013.01); *H04L 43/0852* (2013.01); *H04L 43/0894* (2013.01); *H04L 67/42* (2013.01); *H04L 69/329* (2013.01)

(58) Field of Classification Search
CPC ...... H04L 45/22; H04L 45/28; H04L 12/5692
USPC .......................... 709/200, 227, 238
See application file for complete search history.

(56) References Cited

U.S. PATENT DOCUMENTS

| | | | | |
|---|---|---|---|---|
| 4,912,656 A | * | 3/1990 | Cain | ................. H04B 7/18521 709/242 |
| 5,504,935 A | * | 4/1996 | Vercauteren | ...... H04W 36/0083 455/438 |
| 5,594,781 A | * | 1/1997 | Kozdon | ................ H04W 36/30 455/442 |
| 5,754,543 A | * | 5/1998 | Seid | ........................ H04L 45/12 370/256 |
| 5,812,784 A | * | 9/1998 | Watson | ................... H04L 29/06 709/227 |
| 5,867,661 A | * | 2/1999 | Bittinger | ................. H04L 69/32 370/401 |
| 6,026,077 A | * | 2/2000 | Iwata | ..................... H04L 45/04 340/2.23 |
| 6,198,920 B1 | * | 3/2001 | Doviak | ............... H04L 12/5692 370/352 |
| 6,240,462 B1 | * | 5/2001 | Agraharam | ......... H04L 12/2856 370/238 |

(Continued)

FOREIGN PATENT DOCUMENTS

| | | |
|---|---|---|
| DE | 19904331 | 8/2000 |
| EP | 0562215 A1 | 9/1993 |

(Continued)

OTHER PUBLICATIONS

Perkins, C. (Editor), "RFC 2002—IP Mobility Support", 1996, pp. 1-81.

(Continued)

*Primary Examiner* — Backhean Tiv
(74) *Attorney, Agent, or Firm* — Blakely, Sokoloff, Taylor & Zafman LLP

(57) ABSTRACT

Mobile devices are networked to servers using connections. The connections are monitored to select one or more connections as the active connection. Information from applications is aggregated and transmitted across the active connection in order to network the mobile devices to the servers.

31 Claims, 9 Drawing Sheets

(56) References Cited

U.S. PATENT DOCUMENTS

| | | | | |
|---|---|---|---|---|
| 6,243,581 | B1 * | 6/2001 | Jawanda | 455/432.2 |
| 6,330,231 | B1 * | 12/2001 | Bi | 370/328 |
| 6,363,319 | B1 * | 3/2002 | Hsu | 701/533 |
| 6,400,946 | B1 | 6/2002 | Vazvan et al. | |
| 6,438,602 | B1 * | 8/2002 | Lane | 709/230 |
| 6,470,390 | B1 * | 10/2002 | Westfield | H04L 67/08 370/438 |
| 6,574,461 | B1 * | 6/2003 | Skold | H04B 7/082 455/132 |
| 6,614,808 | B1 * | 9/2003 | Gopalakrishna | H04L 29/06 370/469 |
| 6,674,713 | B1 * | 1/2004 | Berg | H04M 7/1255 370/217 |
| 6,697,333 | B1 * | 2/2004 | Bawa | H04L 45/10 370/238 |
| 6,708,217 | B1 * | 3/2004 | Colson | H04L 67/2823 709/203 |
| 6,735,630 | B1 * | 5/2004 | Gelvin | B60R 25/1004 706/33 |
| 6,751,659 | B1 * | 6/2004 | Fenger | H04L 29/06 709/221 |
| 6,782,403 | B1 * | 8/2004 | Kino et al. | |
| 6,795,851 | B1 * | 9/2004 | Noy | 709/218 |
| 6,901,251 | B1 * | 5/2005 | Kiessling | G06Q 20/40 380/247 |
| 6,961,573 | B1 * | 11/2005 | Moon | H04W 40/02 455/226.1 |
| 7,242,669 | B2 * | 7/2007 | Bundy | G06Q 40/04 370/252 |
| 7,382,882 | B1 * | 6/2008 | Immonen | H04L 63/0428 380/247 |
| 7,944,845 | B2 * | 5/2011 | Farley | H04L 1/0015 370/252 |
| 8,249,057 | B1 * | 8/2012 | Mohaban | H04L 29/06027 370/352 |
| 8,438,308 | B2 * | 5/2013 | Gan | G06F 11/1464 370/242 |
| 2001/0005884 | A1 * | 6/2001 | Serada | H04L 12/4633 713/153 |
| 2001/0034791 | A1 * | 10/2001 | Clubb | H04L 1/1635 709/238 |
| 2001/0038610 | A1 * | 11/2001 | Decker | H04L 12/6418 370/230 |
| 2001/0047420 | A1 | 11/2001 | Talanis et al. | |
| 2002/0021675 | A1 * | 2/2002 | Feldmann | H04L 45/00 370/254 |
| 2002/0062384 | A1 | 5/2002 | Tso | |
| 2002/0099957 | A1 * | 7/2002 | Kramer | H04L 63/0272 726/15 |
| 2003/0145094 | A1 * | 7/2003 | Staamann | G06F 9/465 709/229 |
| 2004/0022191 | A1 | 2/2004 | Bernet et al. | |
| 2005/0132049 | A1 * | 6/2005 | Inoue | G06F 17/3087 709/225 |
| 2008/0008089 | A1 * | 1/2008 | Bornstein | H04L 29/06 370/227 |

FOREIGN PATENT DOCUMENTS

| | | |
|---|---|---|
| EP | 1049306 | 11/2000 |
| WO | WO0013110 A | 3/2000 |
| WO | WO0059252 | 10/2000 |

OTHER PUBLICATIONS

PCT Search Report, PCT/US02/08355, Sep. 11, 2002, 3 pages.

\* cited by examiner

NETWORK COMMUNICATION

CROSS REFERENCE TO RELATED APPLICATIONS

This application claims the benefit of U.S. application Ser. No. 09/811,161, filed Mar. 16, 2001.

BACKGROUND

This invention relates to network communication.

Mobile devices, such as laptop computers, mobile phones, and handheld digital assistants, for example, communicate on wireless networks to enable their users to work in multiple locations and while in transit, such as in homes, airports, airplanes, and public spaces. Typically, the mobile devices run applications that access a server on the Internet by communicating using a single "connection."

DETAILED DESCRIPTION

A seamless and robust information exchange protocol for connecting a device to a secure network can include two or more open connections. The connections may be wireless and may be selectively and efficiently used to enhance information transmission speed and reliability.

Figure 1:
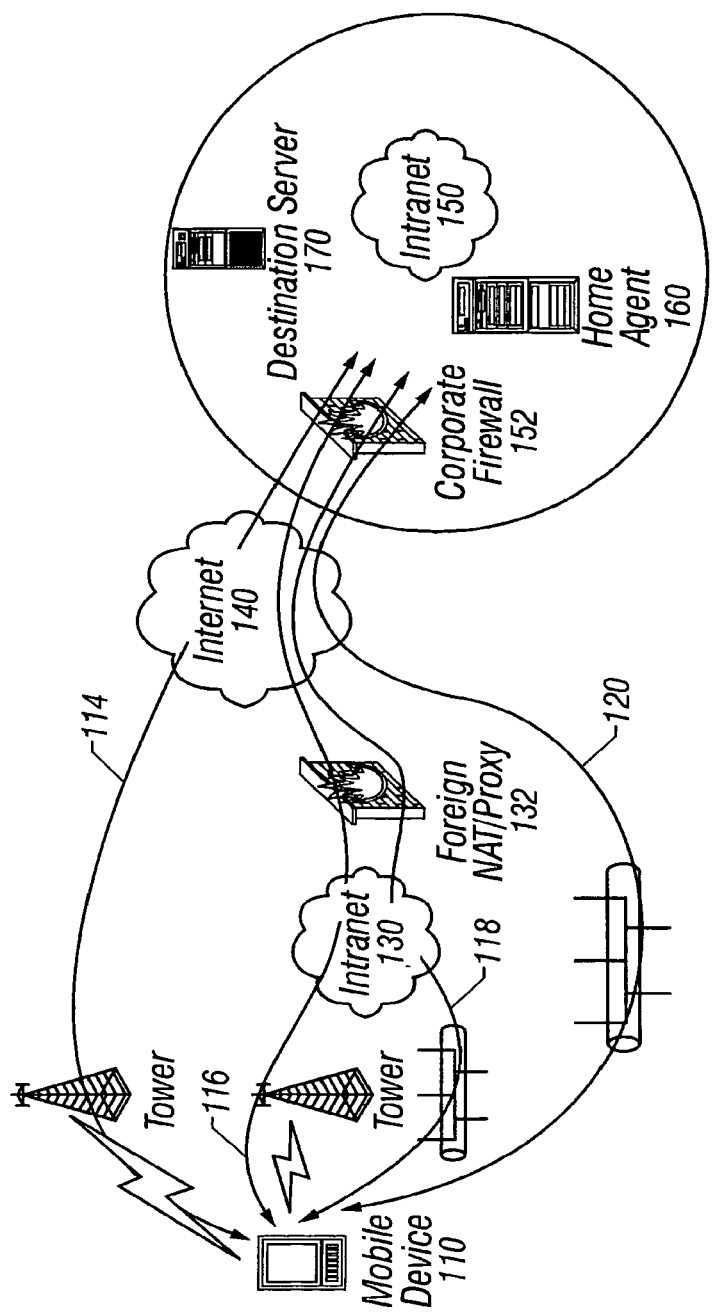
FIG. 1 is a diagram of network connections between a mobile client and a home agent.

Referring to the example shown in FIG. 1, a mobile (or immobile) device 110 establishes four exemplary connections or tunnels with a home agent 160. Examples of mobile devices include laptop computers, handheld computers (e.g., PalmPilots™, handheld digital assistants, key pads), pagers, mobile telephones (e.g., Wireless Application Protocol (WAP) enabled phones), Moving Picture Experts Group Audio Layer 3 (MP3) players, and game and/or entertainment stations. Examples of immobile devices include desktop computers, large appliances, and factory machines.

The terms "connection" and "tunnel" refer to a route for sending and/or receiving information. Information refers to both data (e.g., text, numeric, Boolean, addresses, graphical content, and the like) and commands (e.g., requests, instructions, queries and the like). The home agent can be a computer system (such as a desktop computer, a server, a server farm, or a mainframe).

Connection 114 is a wireless phone link (e.g., third generation wireless networks (3G), second-and-a-half generation wireless networks (2.5G), General Packet Radio Service (GPRS)), I-Mode™ (NTT DoCoMo, Japan), Global System for Mobile Communications (GSM), Code Division Multiple Access (CDMA), or Time Division Multiple Access (TDMA)/Digital Advanced Mobile Phone Service (D-AMPS) wireless link). This connection can be a modem connection that is relayed to an Internet service provider that connects the mobile client 110 to the Internet 140.

Connection 116 is a wireless connection to a local area network (LAN) 130 (e.g., a wireless LAN such as provided by wireless Ethernet, BlueTooth, the Institute of Electrical and Electronics Engineers (IEEE) 802.11a or 802.11b standard (IEEE std. 802.11-1999, published 1999), or Cellular Digital Packet Data (CDPD) connections). Information from this connection can optionally traverse a Foreign Network Address Translator (NAT)/Proxy 132 to connect from the intranet 130 to the Internet 140.

Connection 118 is a wired network connection, e.g., to a corporate intranet 130. Information from this connection also traverses the Foreign NAT/Proxy 132 to connect to the Internet 140.

Connection 120 is a direct connection to the Internet 140, e.g., a Digital Subscriber Line (DSL), Integrated Services Digital Network (ISDN), or cable modem connection. The Internet 140 directs the connections to the home agent 160 that is linked to the Internet by a corporate firewall 152. The home agent 160 can also be linked to a second intranet 150.

The mobile client 110 can be designed to flexibly use a variety of communication protocols (e.g., Transmission Control Protocol (TCP)/Internet Protocol (TCP/IP), User Datagram Protocol (UDP), Hypertext Transfer Protocol (HTTP), Simple Mail Transfer Protocol (SMTP), Post Office Protocol 3 (POP3), or other Internet protocols) for the purpose of communicating to the home agent 160, e.g., on the intranet 150. In some examples, the mobile client 110 is assigned an Internet Protocol (IP) address on the secure intranet 150. Applications running on the mobile client 110 issue network calls using the assigned IP address, typically, using a proxy module on the home agent 160. However, the connections between the mobile client 110 and the home agent 160 may require a different set of addresses. For example, the mobile client 110 may be a guest system having a guest IP address on a second intranet 130 or may be connected to the Internet 140 using a temporary Internet IP address, e.g., through a third party service provider. Addresses, such as the guest IP address and the temporary IP address, are invisible to applications running on the mobile client 110, but are used, e.g., by the network interfaces or operating system, to connect to the home agent 160.

The communication connections may use network address translation (NAT). NAT enables machines within a secure intranet to use a set of assigned IP addresses. NAT translates these assigned IP addresses to external IP addresses for communication with devices outside of the intranet. This protocol enhances network security and allows more efficient assignment of IP addresses within an intranet. Generally, the mobile client 110 will establish connections with the home agent through NAT, e.g., Foreign NAT/Proxy, 132. NAT 132 forwards information, e.g., across a public or insecure network, to the home agent 160 that resides securely behind a firewall 152. The home agent 160 processes the information from the mobile client 110, e.g., decompresses and decrypts the information, to allow the mobile client 110 to function securely with the advantages of a direct connection to an intranet or virtual private network (VPN) 150.

Figure 2:
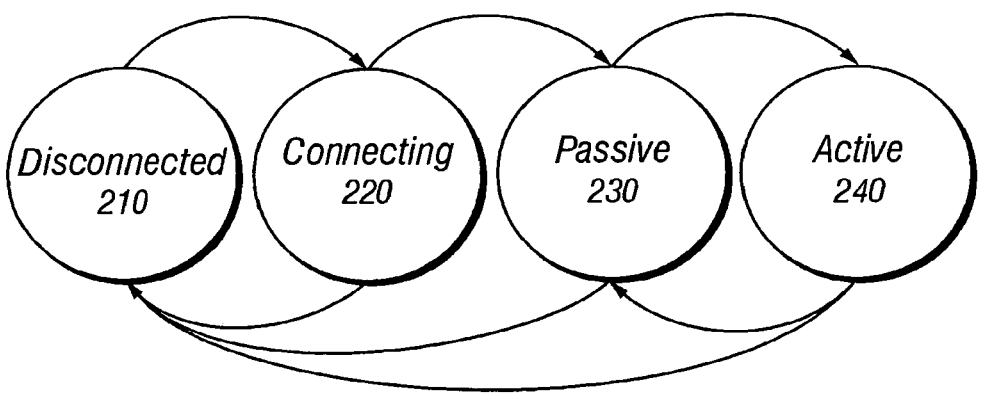
FIG. 2 is a schematic of a tunnel state machine.

Referring to FIG. 2, each connection operates as a finite state machine. The connection can be disconnected 210, connecting 220, passive 230, or active 240. In the active state, a connection sends and receives information with the server. An active connection 240 is switched to passive 230 under certain circumstances, for example, if another connection is more efficient, secure, or economical. A user or system administrator may define parameters for such a switch. The system may monitor the active connection 240 and/or the passive connections 230 for one or more of the following parameters: signal strength, transmittal rate, latency, cost of transmittal, and connection integrity. Monitoring and switching of connections may be performed without the cognizance of the user.

An active connection 240 is switched to the disconnected state 210, for example, in the event of a loss of connection integrity (e.g. an abrupt break or a security breach). A disconnected connection 210 is switched to connecting 220 when appropriate.

A connecting connection 220 is switched to passive 230 once it is established and properly initialized. A passive connection 230 is generally not used to send or receive information except as necessary to monitor or maintain its integrity. In particular, a passive connection 230 is not used to send or receive application information. The passive connection 230 may be used to send instructions for its own activation. For example, if there is an abrupt disconnection of the active connection 240, either or both of the server 160 and the mobile client 110 can issue commands on a passive connection 230 indicating that it should be activated.

More than one connection may be active at a given time. Information is divided between such active connections 240, e.g., in proportion to the transfer rate of the particular connection, its latency, its reliability and so forth. The use of multiple connections at one time increases overall information transfer rates.

Figure 3:
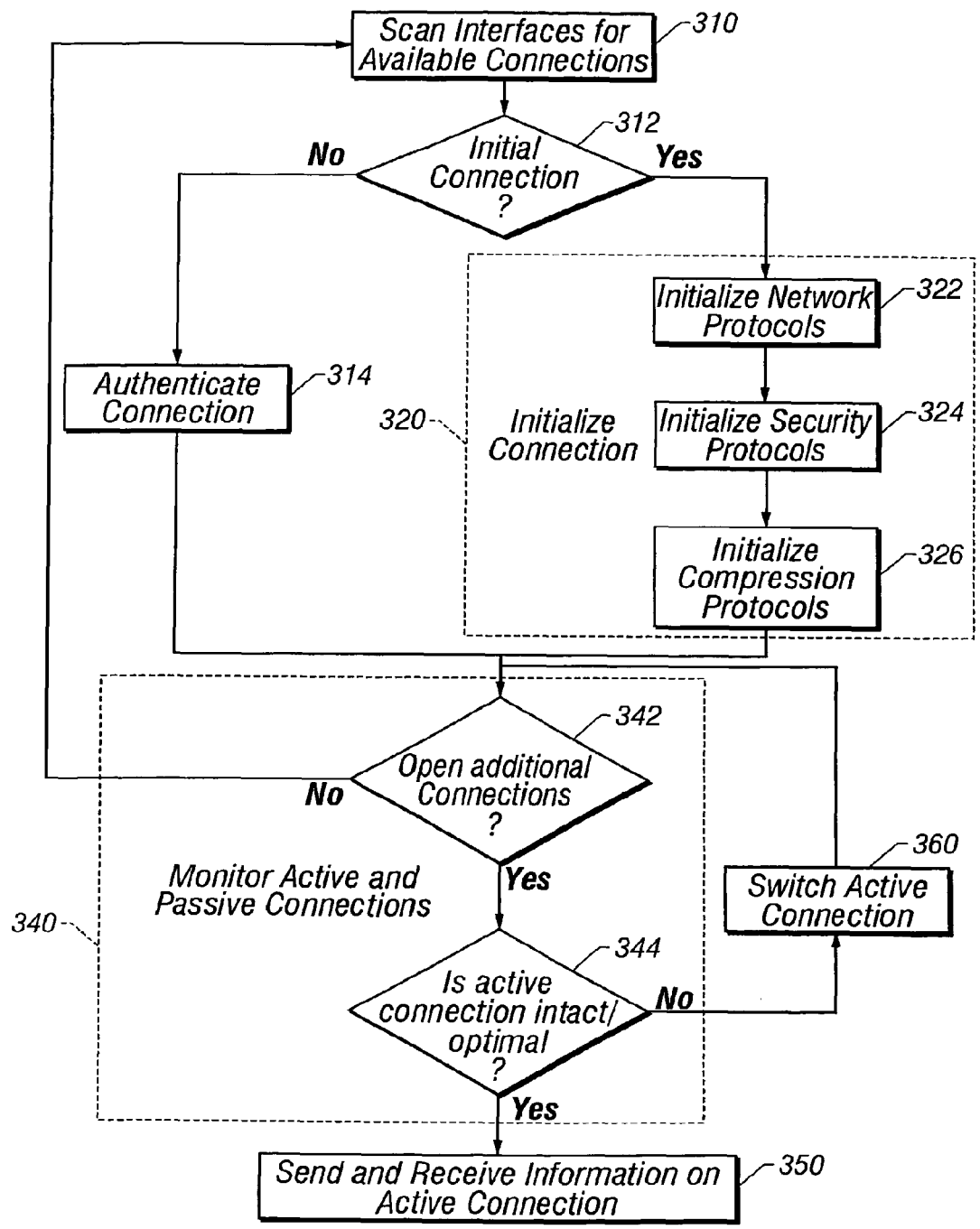
FIG. 3 is a flow chart of a process for connecting a mobile client.

Referring now also to FIG. 3, the mobile client 110 scans 310 available network interfaces checking for ones that permit connection to the home agent 160. The connection process includes initializing communication protocols 320. Typically, the steps included in process 320 are only required for the initial connection 312. Thus, adding additional passive connections 230 and switching among active connections 240 are rapid and efficient.

To initialize a connection 320, network addressing 322 is initialized. For example, the mobile client 110 receives a Dynamic Host Configuration Protocol (DHCP) address from the home agent 160 or from another server. The mobile client 110 can also detect the presence of a proxy module on the home agent 160. Security protocols are established and authenticated 324 as are compression protocols 326. Examples of security protocols include transport layer security (TLS), secure sockets layers (SSL), and wireless TLS (WTLS). Non-limiting examples of a compression protocol include: "Lossless Compression" (LZS®) and Microcom Networking Protocol-5 (MNP5). Optionally, the mobile client 110 and home agent 160 exchange secondary authentication information, such as authenticated names, digital certificates and cookies.

Once the protocols are initialized for a session, initiation of additional connections (e.g., at least a second connection) to the home agent 160 only requires authentication 314 to verify that a new connection is between a mobile client 110 and/or a home agent 160 that are already party to a session. The same network, security, and compression protocols and parameters are used for information exchange as for the initial connection. For example, the common parameters for multiple sessions may include cryptographic keys, network address assignments, and compression formats (e.g., compression dictionaries). Accordingly, in such examples, all passive 230 and active connections 240 use the same security level. The precise level can be determined by a system administrator or user.

In other examples, the system uses different security protocols and/or compression levels for the different connections. The home agent 160 and mobile device 110 establish different security procedures for each connection, e.g., each passive or active tunnel, depending on the connection type. Thus, a connection that requires firewall traversal, e.g., a mobile phone link to the Internet, requires high level security, whereas a wired Ethernet connection to a LAN does not require such a high level of security.

The mobile client 110 and/or home agent 160 can be programmed to determine if additional connections should be opened 342. For example, parameters can be set for opening connections, e.g., based on the fee levied for using a particular connection, the connection speed, power drain (e.g., battery power required), and security. The system can scan available passive connections 230 and active connections 240 for a variety of criteria. For example, the mobile client 110 can assess the number of current connections (e.g. active or passive connections), their signal strength, and connection speed. The mobile client 110 can also detect its own geographic location to determine if it is in transit or leaving the effective range of a current connection, e.g., by using the global positioning system (GPS). Such parameters can be used to determine if additional connections should be opened 342, if active connections 240 should be switched 344, and if existing connections should be closed.

Similarly, the mobile client 110 and/or home agent 160 can be programmed to determine if the active connection 240 should be switched 360. Parameters for the decision can include the relative signal strength, latency, transmittal rate, security, cost (e.g., charge per minute or per byte), power drain, and reliability of the different connections. The process of switching 360 one connection from active 240 to passive 230 and another from passive 230 to active 240 is termed a "handoff." The use of common information exchange protocols for all connections can facilitate handoff. For example, TCP timers, packet size and windows do not need to be reconfigured for handoff. This is important for abrupt handoffs when the active connection 240 is unexpectedly lost and a passive connection 230 must be promoted to active 240.

Figure 4:
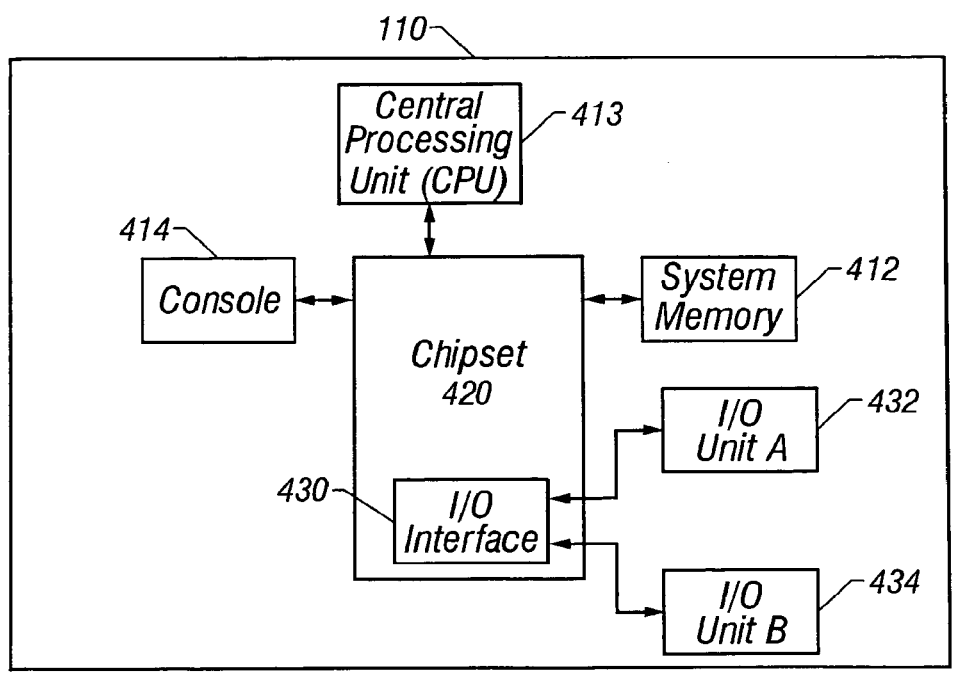
FIG. 4 is a schematic of a mobile device.

Referring to FIG. 4, an exemplary device 110 is equipped with a memory 412, and a processor 413 for executing instructions. The device 110 also has a console 414 (e.g., including a keyboard and display) for sending results to the user and for receiving user commands. The device 410 includes a chipset 420 or other interface for connecting the device's subsystems. The chipset 420 includes an input/output (I/O) interface 430 such as an I/O controller hub (ICH) or a basic I/O system (BIOS). For example, the ICH can be the Intel® 82801 ICH. The I/O interface is connected to two or more I/O units 432 and 434. These I/O units 432 and 434 are used to establish communication channels with the home agent 160. For example, the I/O units can include a modem, (e.g., a modem connected to an internal or external mobile phone, a cable modem), an I/R port, a network card, Blue-Tooth, packet cellular communicator, a satellite connection or a wireless interface (e.g., a wireless interface for CDPD, GPRS, GSM, 802.11a, 802.11b or BlueTooth).

Figure 5:
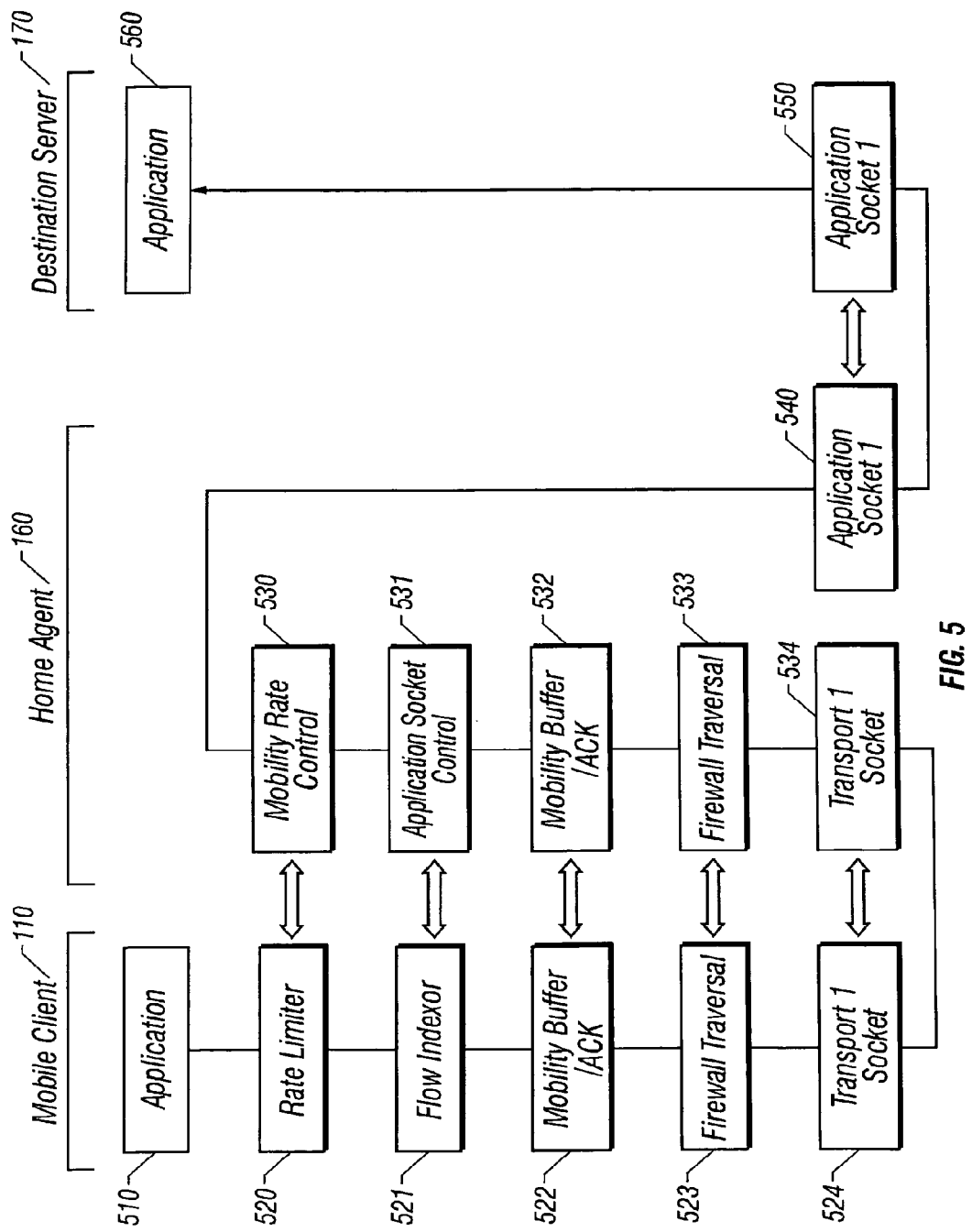
FIG. 5 is a schematic of a stack for providing information to an application.

Referring to FIG. 5, information from an application 510 running on a mobile client 110 is mapped to an application 560 running on a destination server 170 (i.e. a server other than the home agent 160). The mobile client 110 is connected to the destination server 170 through the home agent 160. The information is passed to a rate limiter 520 that monitors information transfer rates and quality of service parameters of the application.

In some examples, the rate limiter 520 implements the desired quality of service policy such that some application data is given bandwidth priority over other application data. The rate limiter 520 also guards against the mobile client 110 sending data to the home agent 160 faster than the home agent 160 can forward the data to its final destination, e.g., a destination server 170. The home agent 160 can instruct the rate limiter 520 on the client to slow down or stop sending data for a specific destination (e.g., the destination server 170) when the home agent 160 is excessively buffering data. This situation can occur, for example, when the mobile client 160 is sending data to a system with a slower wireless connection (e.g., the mobile client 160 is sending information to another mobile client through the home agent 160).

The flow indexer 521 monitors outgoing and incoming requests and information for the application. The flow indexer 521 can also frame information from the application with information for other applications. The mobility buffer 522 stores outgoing information (e.g., as packets) until an acknowledgement of its receipt is obtained from the home agent 160. If not receipt is received after an interval, the active connection 240 can be switched and the information (e.g., information packet) can be resent. Likewise, the mobility buffer 522 issues acknowledgments for information received from the home agent 160. The acknowledgements can be sent occasionally, e.g., along with outgoing data, to clear the other-side's mobility buffer. The acknowledgment can be time-insensitive. For example, the other-side's mobility buffer can send additional information before acknowledgments are received. The number of acknowledgments sent can be tailored to reflect the capacity of the other-size's mobility buffer. The mobility buffer sizes can be negotiated when opening the first connection between the client and home agent.

The information is then sent across a firewall 523. This process can include compression or decompression and/or encryption or decryption. Next, the information is sent to the transport socket 524 of the active connection 240.

The information is sent through the active connection 240 from the transport socket 524 on the mobile device 110 to the transport socket 534 on the home agent 160. The home agent 160 processes the information in a corresponding manner with firewall traversal 533, mobility buffering and acknowledgement 532, application socket control 531, which similarly dissembles framed information and routes the data to its final destination on the network (e.g., an intranet or the Internet), and mobility rate control 530. These processes map incoming information to an application socket 540 on the home agent 160. This socket, in turn, can be linked to an application socket 550 on a destination server 170 that is networked to the home agent 160 by a VPN 150. Although the processes described above relates to information sent from the mobile device 110 to the home agent 160, the same processes can be executed for information flowing from the home agent 160 to the mobile device 110.

Application-specific information may be directed into the active connection 240 in various ways. Applications can be individually notified of the active connection 240 and can themselves direct information to the active connection 240. In other examples, all application-specific information is directed to a network interceptor that routes the information to the active connection 240. For example, applications network calls and data may be captured directly from the applications and forwarded to the home agent 160. In other examples, applications use local proxies, e.g., proxies running on the mobile client 110 to send traffic to the active connection 240.

In some examples, "sockets" are created as software objects which connect an application input/output stream to a network interface. Proxies are also used to process information from other applications.

Figure 6A:
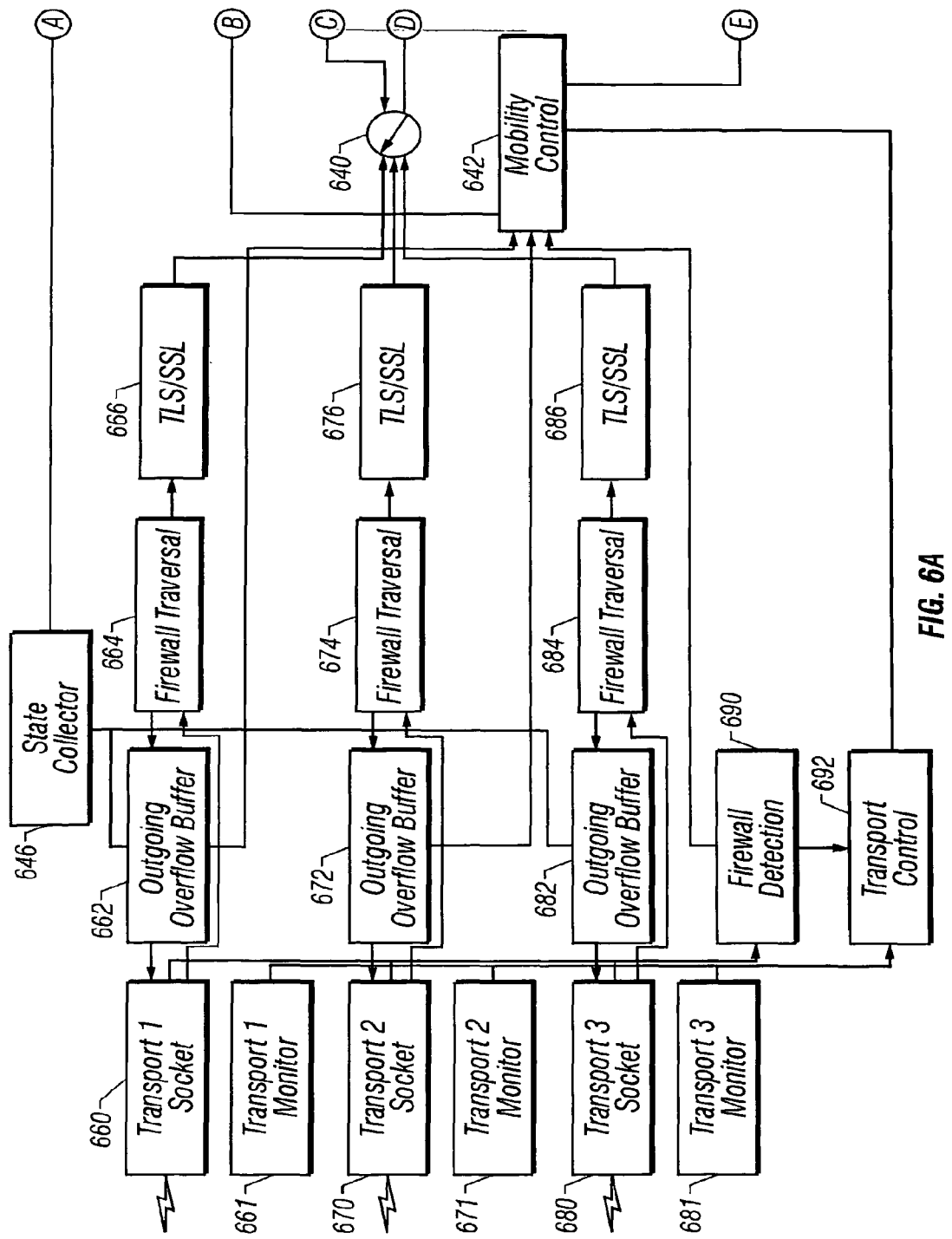
FIG. 6 is a schematic of information processing units implemented by a mobile client.
Figure 6B:
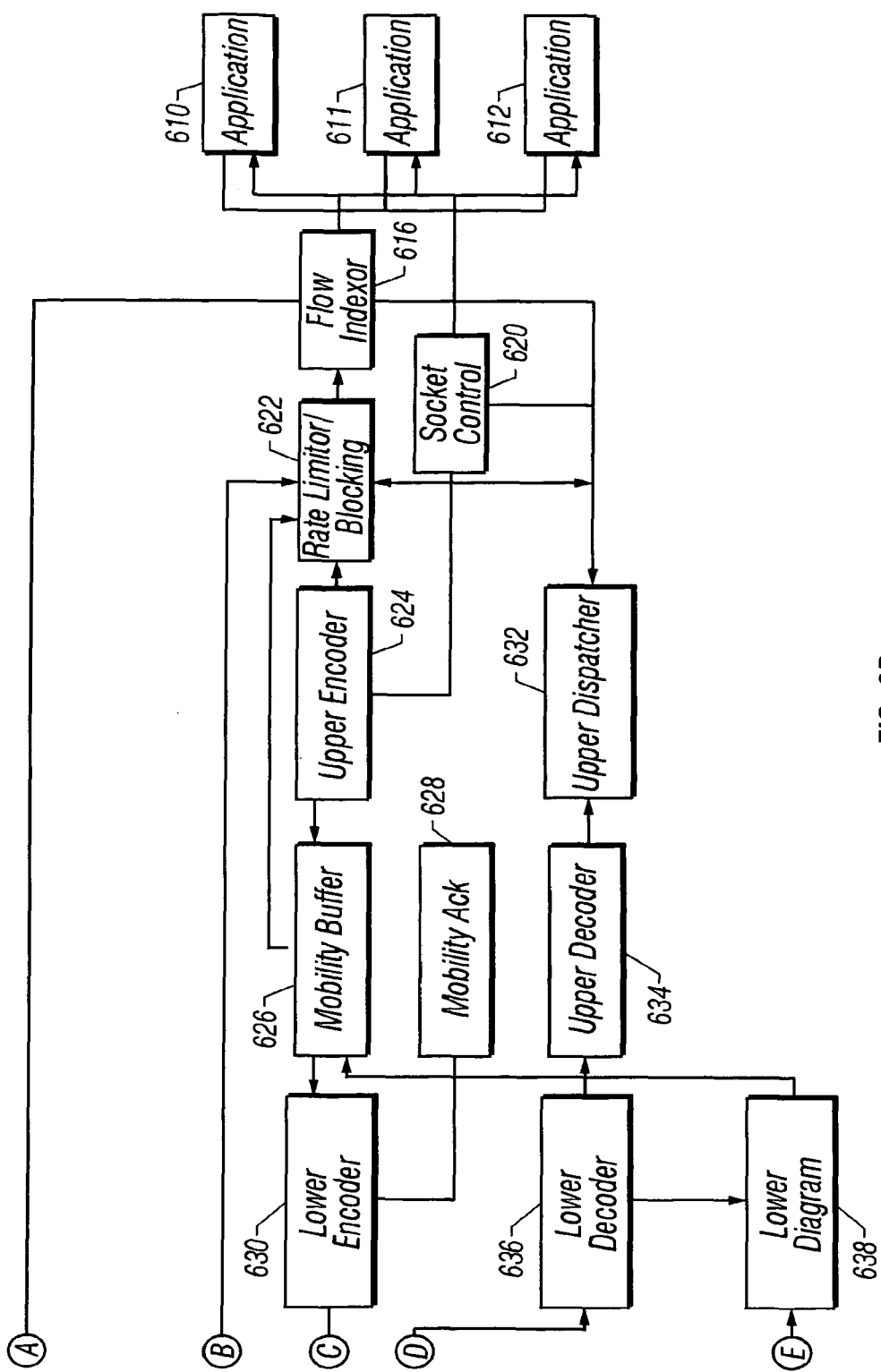

Referring to FIG. 6 and proceeding from right to left, the mobile device 110 is running applications that use three application sockets 610, 611, and 612. An application that requires a network connection can employ one or more of the application sockets 610, 611, and 612. Information exchange to and from a socket is monitored by the flow indexer 616 and by socket control 620.

Outgoing information is processed by the flow indexer 616 and the rate limiter 622. Rate limiter 622 provides quality of service and protects against overflow of the home agent 160 buffer; the home agent 160 provides the rate limiter 622 with flow control notifications. Flow control systems (e.g., XON/XOFF or rate-based flow control systems) monitor information transfer rates, buffer load, and receipt acknowledgements. Flow control can be implemented on application and transport sockets on both the mobile client 110 and the home agent 160. For example, if the home agent 160 is unable to send information to a third destination 170 as fast as it receives it from the mobile client 110, the overflowing socket on the mobile client 110 is notified. Such measures can prevent the home agent 160 from buffering excessive data.

Outgoing information from multiple application sockets is packaged, compressed, encrypted and framed, by units including the upper encoder 624 and the lower encoder 630 via the mobility buffer 626. The mobility buffer 626 keeps a copy of the outgoing data until reception is acknowledged. If the active connection is lost and re-established (possibly on a different network interface), the content of mobility buffer 626 can be resent immediately, or, the computer (home agent or client) can wait for a mobility buffer acknowledgement 628 (sent when a connection becomes active) before resending the exact amount of data the other side requires from the mobility buffer. The decision to send or wait before sending can be made based on the amount of data in the mobility buffer, the estimated bit rate of the active interface, cost of the interface and other values.

Router 640 directs traffic from the lower encoder 630 to the active transport socket (e.g., one of 660, 670, or 680). The active transport socket is a dedicated portal for information flow to the active connection 240. Information from the transport sockets to the application sockets is bi-directional. Information is secured using TLS or SSL protocols (666,676,686). The information is sent across the network firewall by the firewall traversal unit (664,674,684). Overflow information is buffered by the mobile client 110 using the outgoing overflow buffer (662,672,682). This information is stored until the home agent 160 acknowledges receipt of the contents, e.g., each segment of the contents.

Each transport socket 660, 670 and 680 is also monitored by a transport monitor 661, 671, and 681. General transport control 692 is overseen by the mobility control unit 642. These can interface with firewall detection 690. General information flow is also monitored by the Statistics (Stats) collector 646.

Incoming information is processed to traverse the firewall 664, and then verified and decrypted by the TLS/SSL unit 666. Once processed the information is sent via unit 640 to the lower decoder 636, the lower dispatcher 638 and the upper decoder 634 and the upper dispatcher 632. These units can effect multiple information processing steps, e.g., removing framing information and decompressing and decrypting the information stream or packet. For example, socket control 620 routes information packets to the appropriate application socket 610, 611 and 612.

The flow indexer 622 determines the information transmittal rate of the transport socket and appropriately buffers and/or compresses the information. For example, for a slow connection, information is compressed to minimize information size, e.g., number of bytes, despite overhead in computational time to process the information. In contrast, for rapid connections, e.g., when the transmittal rate is not limiting, information is either not compressed or compressed using rapid algorithms that achieve more modest reduction in information size.

Information transmittal rates can also monitored by applications to indicate the capacity of the active connection 240. For example, if capacity is available, applications can process low-level background networking tasks, such as backing up and updating files. If capacity is limited, applications can reduce their communications burden, e.g., by requesting text or WAP pages instead of graphics.

Figure 7A:
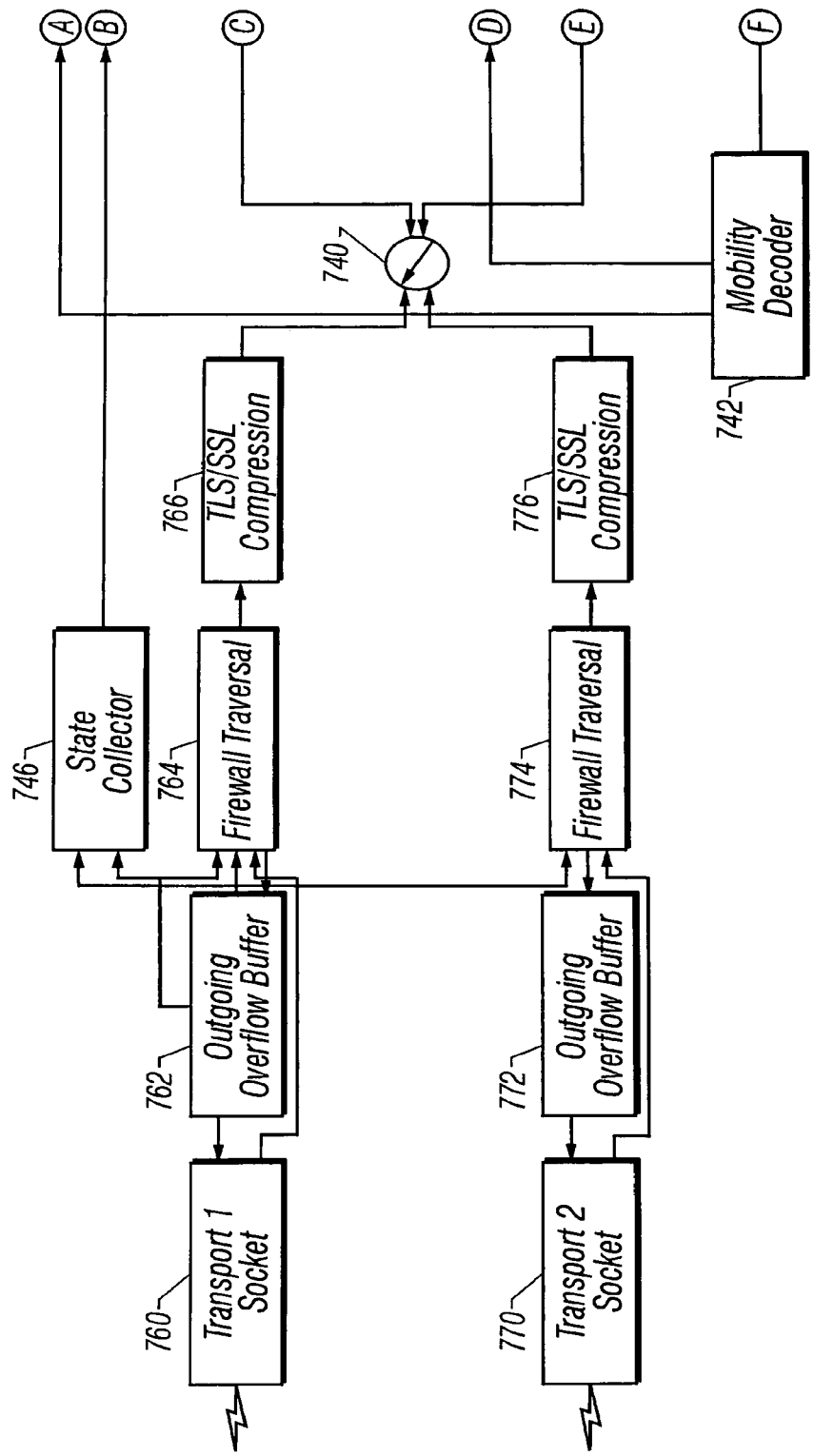
FIG. 7 is a schematic of information processing units implemented by a home agent or server.
Figure 7B:
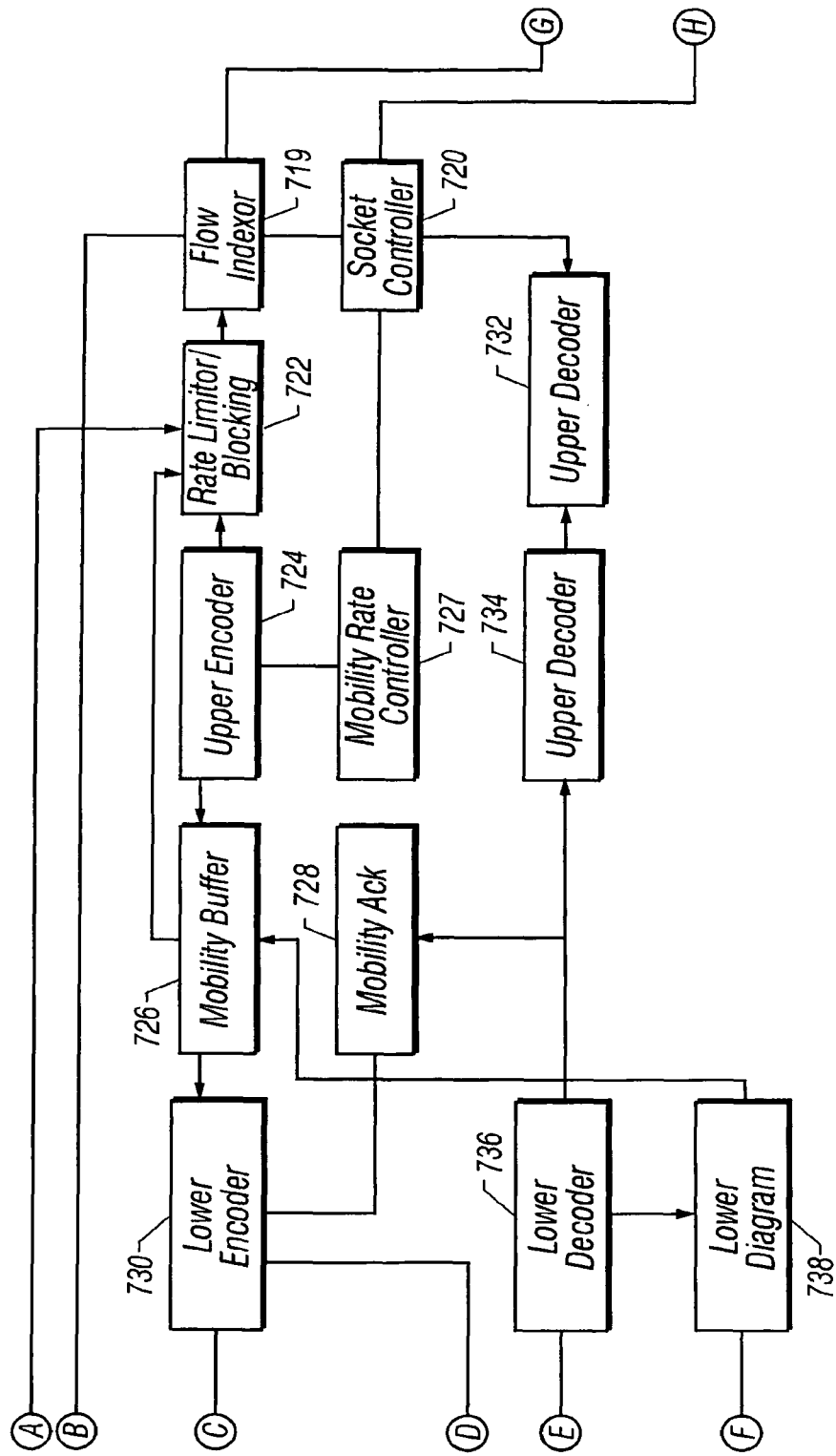
Figure 7C:
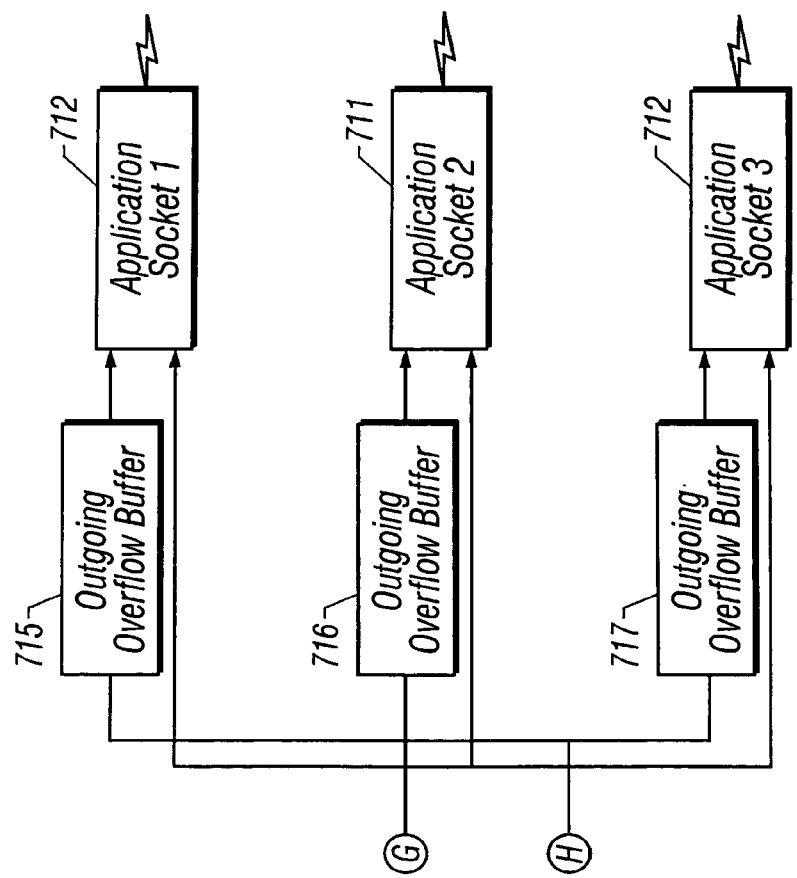

Referring now to FIG. 7 and proceeding from left to right, the home agent 160 has a process configuration similar to the one for the mobile client 110. Information from connections is mapped to transport sockets 760 and 770. The information is sent for firewall traversal 764 and 774 and then for security verification and decryption 766 and 776. A router 740 directs incoming information to the lower decoder 736. Outgoing information is also directed by the router 740 toward the transport sockets 760 and 770 by way of output overflow buffers 762 and 772.

Mobility control 742 monitors the information overflow in these buffers 762 and 772, and can appropriately regulate outgoing information through the rate limiter 772, the router 740, and the lower encoder 730.

Incoming information is processed by the lower decoder 736 and the upper decoder 734. These decoders are linked to the lower dispatcher 738, which can issue tunnel or connection specific commands, and the upper dispatcher 732, which can issue application specific commands. The decoded information is dissembled into individual items and then distributed to the correct application sockets 710, 711, and 712 on the home agent 160. Hence, information from the application sockets 610, 611, and 612 running on the home agent 160, is mapped to corresponding application sockets 710, 711, and 712 on the home agent 160. As described above, these application sockets also generate outgoing information for delivery to the mobile device 110.

As with corresponding modules described for FIG. 6, the server side can include outgoing overflow buffers (715, 716, 717), flow indexer 719, rate limitor 722, upper encoder 724, mobility buffer 726, mobility buffer acknowledgement 728, mobility rate controller 727, socket controller 720, upper decoder 734, and upper dispatcher 732.

The information can be transmitted through the active connection 240 by a variety of methods, for example, in packets or as a continuous stream.

The information sent as packets can be framed. The information from different application sockets can be aggregated such that individual commands and data items from different applications are included in a single information packet. This packet is encrypted and compressed as a single unit using the previously initialized protocols thus obviating the need to include authentication, cryptographic, and compression headers. The packet is framed with minimal header information, such as a checksum and a packet identifier. On reception of the packet, an acknowledgement is issued for the entire packet, e.g., an identifier and/or checksum for the received information. The aggregation of data is in contrast to systems that emit individual data packets for each network call made or data item sent by individual applications. In addition to reducing overhead, framing multiple items together enables larger individual information packets, which can include related items. By placing related items together, the latency due to packet mis-alignment, such as occurs when conventional packets arrive out of order, is reduced.

Optionally, the protocol includes the reduction of "round trip" information exchanges. When desired, this feature determines if multiple information exchanges between the mobile device and a destination system 170 (i.e., a system other than the home agent 160) can by emulated by a proxy module running on the home agent 160. The proxy module interacts with the destination system 170 on behalf of the mobile client 110 without having to exchange information with the mobile client 110. The use of the proxy module reduces network traffic and overcomes inefficiencies due to the latency of some wireless connections. Proxy modules can be generic, e.g., able to support more than one application, or can be dedicated, e.g., application specific.

For example, the use of a web browser requires at least three round trips that can be obviated by a proxy module. Conventionally, when a user enters a uniform resource locator (URL) for a web site, the web browser on the mobile client 110 first sends a request to a domain name server to obtain the actual IP address of the URL. The mobile client 110 then initiates a TCP connection with the web server at the IP address. Only after confirmation does the mobile client 110 send a hypertext transfer protocol (HTTP) request to the web server and subsequently receive the hypertext content.

The use of a proxy module for the web browser instead replaces the three network roundtrips with a single exchange between the home agent 160 and the mobile client 110, thus reducing information traffic in the active connection 240. When a user enters a URL for a web site, this URL request is sent on the active connection 240 to a proxy module on the home agent 160 or on a destination server 170. The proxy module queries the domain name server, initiates the TCP connection, and sends the HTTP request. These steps are done without contacting the mobile client 110. When the proxy module receives the hypertext content, it directs it back over the active connection 240 to the mobile client 110.

An additional method to reduce network traffic is the use of application specific content re-purposing. This feature reformats information, particularly content. Extraneous content can be removed to reduce the amount of data. For example, data is translated by the home agent 160 from hypertext markup language (HTML) and graphics formats to i-mode or WAP compatible information.

Frequently, the client 110 and/or server 160 have more than one application sending information along a single active connection. Quality of service protocols are utilized to determine which application has priority for communicating information. Quality of service parameters can be implemented at many levels, for example, at the level of the upper encoder 624 and lower encoder 630 which frame network calls and data for different applications. The relative content of each framed data packet can be varied in accordance to quality of service parameters.

Further, the home agent 160, as well as the mobile client 110, can determine quality of service. Quality of service can be asymmetric such that an application may have high priority on the home agent 160 to send data to the mobile device 110, but may have low priority on the mobile device 110 for sending data to the home agent 160. A quality of service parameter indicating priority for information exchange can be transmitted from the home agent 160 to the mobile device 110 or from the mobile device 110 to the home agent 160.

Other implementations are within the scope of the claims.

For example, the techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be implemented as a machine-readable storage medium, configured with a program, where the storage medium so configured causes a machine to operate in a specific and predefined manner.

The processes described here may be executed by an embedded system.

What is claimed is:

1. A method comprising:
   at a wireless device, establishing a first wireless connection to a home agent implementing a first communication protocol secured by a first security protocol;
   at the wireless device establishing a second wireless connection to the home agent implementing a second communication protocol secured by a second security protocol;
   selecting, at the wireless device, an active connection to the home agent from among connections including the first and second connections based on connection selection criteria including signal strength, transmittal rate, latency, cost of transmittal, and information route integrity; and
   communicating information configured for the active connection via the selected active connection.

2. The method of claim 1 further comprising:
   communicating information configured for the first connection as the active information route prior to selecting the second connection as the active information route.

3. The method of claim 1 in which a single one of the connections is selected as the active connection.

4. The method of claim 1 further comprising
   monitoring the first and second connections for a parameter selected from the group consisting of signal strength, transmittal rate, latency, cost of transmittal, and information route integrity; and
   reselecting the active connections to optimize the parameter.

5. The method of claim 1 in which the information is communicated in packets that include aggregated information for more than one application.

6. The method of claim 1 in which the information includes a command that is effected by a module on the server.

7. The method of claim 6 in which the command causes the server to contact a remote system, receive a reply from the remote system, and effect a response without transmitting the reply to the device.

8. The method of claim 1 in which the information comprises an aggregation of information from applications, the extent of aggregation for each application being dependent on an indicator of priority for information exchange associated with each application.

9. The method of claim 1 further comprising exclusively using the active connection for said communicating information.

10. A method comprising:
    at a server, accepting two or more wireless connections having different communication protocols communicating information configured by a wireless device, wherein each communication protocol is secured with a different security protocol;
    selecting one or more of the connections as an active connection to the wireless device based on connection selection criteria including signal strength, transmittal rate, latency, cost of transmittal, and information route integrity; and
    communicating communication protocols information using the selected active connection.

11. The method of claim 10 in which a single one of the connections is selected as the active information route.

12. The method of claim 10 in which the information is communicated in packets, each of at least some of the packets includes aggregated information for different applications on the device.

13. The method of claim 10 in which the information includes a command for a module.

14. The method of claim 13 further comprising effecting the command.

15. The method of claim 14 in which the module effects the command by contacting a remote server, receiving a reply from the remote server and effecting a response without transmitting the reply to the device.

16. The method of claim 10, in which the information is an aggregation of information for applications, the extent of aggregation for each application being dependent on an indicator of priority for information exchange associated with each application.

17. The method of claim 10 further comprising exclusively using the active connection for said communicating information configured for the communication channel.

18. An apparatus comprising a processor and software configured to cause the processor to:
    establish a first wireless connection to a server via a first communication protocol secured by a first security protocol;
    establish a second connection to the server via a second communication protocol secured by a second security protocol;
    select an active connection from among a plurality of connections to the server including the first and second connections based connection selection criteria including signal strength, transmittal rate, latency, cost of transmittal, and information route integrity; and
    communicate communication protocols information using the selected active connection.

19. The apparatus of claim 18 in which the processor is further configured to monitor the connections for a parameter selected from the group consisting of signal strength, transmittal rate, latency, cost of transmittal, and information route integrity; and
    reselect the active connection to optimize the parameter.

20. The apparatus of claim 18 in which the information is communicated in packets, each of at least some of the packets includes aggregated information for different local applications.

21. The apparatus of claim 18 in which the information includes commands that are effected by a module on the server.

22. The apparatus of claim 18, in which the processor is further configured to exclusively use the active connection for said communicate information configured for the communication channel.

23. An article comprising a non-transitory machine-readable medium that stores machine-executable instructions, the instructions causing a machine to:
   establish a first wireless connection to a server via a first communication protocol secured by a first security protocol;
   establish a second connection to the server via a second communication protocol secured by a second security protocol;
   select an active connection from among a plurality of connections to the server including the first and second connections based connection selection criteria including signal strength, transmittal rate, latency, cost of transmittal, and information route integrity; and
   communicate communication protocols information using the selected active connection.

24. The article of claim 23 in which a single one of the connections is selected as the active connection.

25. The article of claim 23 in which the instructions further cause the machine to monitor the connections for a parameter selected from the group consisting of signal strength, transmittal rate, latency, cost of transmittal, and information route integrity; and
   reselect the active connection to optimize the parameter.

26. The article of claim 23 in which the information is communicated in packets, each of at least some of the packets includes aggregated information for different local applications.

27. The article of claim 23 in which the information includes commands that are effected by a module on the server.

28. The article of claim 23, in which the instructions further cause the machine to exclusively use the active connection for said communicate information configured for the communication channel.

29. A system comprising:
   a device, a server, and communication links, in which the device is configured to:
      establish a first wireless connection to a server via a first communication protocol secured by a first security protocol;
      establish a second connection to the server via a second communication protocol secured by a second security protocol;
      select an active connection to the server from among the first and second connections based on a connection selection criteria including signal strength, transmittal rate, latency, cost of transmittal, and information route integrity; and
      communicate communication protocols information configured for the communication channel using the selected active connection.

30. The system of claim 29 in which the device is further configured to monitor the connections for a parameter selected from the group consisting of signal strength, transmittal rate, latency, cost of transmittal, and connection integrity; and
   reselect the active connection to optimize the parameter.

31. The system of claim 29, wherein the device is further configured to exclusively use the active connection for said communicate information configured for the communication channel.

\* \* \* \* \*